United States Patent
Pierre et al.

(10) Patent No.: US 8,829,102 B2
(45) Date of Patent: Sep. 9, 2014

(54) HIGH LOADING CARBON BLACK MASTERBATCH FOR PRESSURE PIPE APPLICATIONS

(75) Inventors: Santiague Pierre, Liege (BE); Alain Thielen, Thimister (BE); Davide Cammarata, Liege (BE)

(73) Assignee: Cabot Corporation, Boston, MA (US)

( * ) Notice: Subject to any disclaimer, the term of this patent is extended or adjusted under 35 U.S.C. 154(b) by 306 days.

(21) Appl. No.: 12/913,350

(22) Filed: Oct. 27, 2010

(65) Prior Publication Data

US 2012/0108725 A1 May 3, 2012

(51) Int. Cl.
*C08K 3/04* (2006.01)
*C08L 23/06* (2006.01)
*C08J 3/22* (2006.01)

(52) U.S. Cl.
CPC .............. *C08J 3/226* (2013.01); *C08L 23/06* (2013.01); *C08J 2423/04* (2013.01); *C08K 3/04* (2013.01); *C08L 2310/00* (2013.01)
USPC ......................................... 524/495; 524/496

(58) Field of Classification Search
CPC ........ C08J 3/226; C08J 2423/04; C08K 3/04; C08L 23/06; C08L 2310/00
USPC ................................. 524/495, 496
See application file for complete search history.

(56) References Cited

U.S. PATENT DOCUMENTS

| | | | |
|---|---|---|---|
| 4,369,267 A | 1/1983 | Keung | |
| 5,041,473 A * | 8/1991 | Gau et al. | 523/330 |
| 7,250,473 B2 * | 7/2007 | Schramm et al. | 525/240 |
| 7,416,686 B2 | 8/2008 | Aarila et al. | |
| 8,114,493 B2 * | 2/2012 | Sherman et al. | |
| 2002/0086917 A1 | 7/2002 | Chung et al. | |
| 2006/0275571 A1 | 12/2006 | Mure | |
| 2007/0276111 A1 * | 11/2007 | Goldberg et al. | 526/352 |
| 2009/0252910 A1 * | 10/2009 | Baeckman et al. | 428/36.92 |

FOREIGN PATENT DOCUMENTS

WO 9957193 11/1999

OTHER PUBLICATIONS

International Search Report with Written Opinion, dated Jan. 4, 2012, received in international application No. PCT/US2011/057636, 10 pgs.
International Preliminary Report on Patentability, dated Apr. 3, 2013, received in international patent application No. PCT/US2011/057636, 6 pgs.
Calcopolychem Ptv. Ltd., "Calco Polychem Black Masterbatch", http://www.calcopolychem.com/black_mb.php, Copyright 2009, web., Sep. 16, 2010, 1pg.
Azomaterials, "Carbon Black for Pressure Pipes, Electrostatic Discharge and Polyolefin Film", http://www.azom.com/details.asp?articleid=2084, web., Mar. 4, 2010, 5 pgs.
Shizhong Su and Santiago Miguel Olaizola, "DELILA Development of Lithography Technology for Nanoscale Structuring of Materials Using Laser Beam Interference", Dec. 31, 2006, 66 pgs.
Cabot Corporation, "Masterbatches Dispersion and Dilution", 6 pgs.
Cabot Corporation/Safety, Health and Environmental Affairs, "Materials Safety Data Sheet—Carbon Black", Apr. 6, 2007. 11 pgs.
Cabot Corporation, "P-Type Black Elftex P100", 2004, 2 pgs.
Ineos Polyolefins, "Safety Data Sheet High Density Polyethylene", Mar. 28, 2007, 4 pgs.
Filip Smeets/Cabot Corporation, "Dubai Plast Pro 2003, New P-type Black for Pressure Pipe Compounds", 20 pgs.
Ineos Polyolefins, "Provisional Product Technical Information— ELTEX A1140P", Nov. 2008, 2 pgs.
KWD Globalpipe, Information-Import-Export Service Marketing-Charts-Documentation, Nov. 27, 2007, 14 pgs.
Cabot Corporation, "Masterbatches for Injecting Moulding", 2008, 16 pgs.
Cabot Corporation, "Carbon Blacks—P-type Blacks for Premium Performance in Pressure Pipe Applications", 2008, 8 pgs.
Cabot Corporation, "Masterbatches Melt Flow Index", 6 pgs.
Wang, M., Wang, T., Wong, Y., Shell, J. and Mahmud, K., "NR/Carbon Black Masterbatch Produced with Continuous Liquid Phase Mixing", Elastomers and Plastics, 2002, 9 pgs.
Colloids Limited, "Product Technical Data, Product Reference: PE 48/118", 1 pg.
"Pipe: General Application Guide", 8 pgs.
Borouge, "Pre Compounded PE100 Articles & Reports on Plastic Industry", http://www.plastemart.com/upload/Literature/HDPE_PE100-long-life-water-pipe-asp, web., Apr. 30, 2001, 3 pgs.
Total Petrochemicals Research Feluy, "Technical Data Sheet—High Density Polyethylene Blow Moulding, Polyethylene HDPE 2008 SN 60", 1 pg.
Welcome to ESSBEE Polymers, Printed on website http://2en.info/ess/Welcome%20To%20ESSBEE%20POLYMERS.doc, 3 pages.

\* cited by examiner

*Primary Examiner* — Angela C Scott

(57) ABSTRACT

A masterbatch for pressure pipe applications is disclosed. The masterbatch includes carbon black in a concentration that is in excess of 40 weight percent (wt %) of the masterbatch, and a high-density polyethylene (HDPE) carrier resin in a concentration that is in the range of 40 to 60 wt % of the masterbatch and has a melt flow index above 100 g/10 min at 2.16 kg/190° C. and a weight average molecular weight (Mw) that is less than 100000. The masterbatch may further include one or more additives (e.g., lubricant and/or an anti-oxidant). In some embodiments, microdispersion of carbon black in the masterbatch is rated less than 3 (according to ISO 18553). In one specific case, 98% or more of observed carbon black agglomerates are less than 30 microns. The masterbatch may be included, for example, in a pressure pipe compound where it is diluted with a base polymer.

20 Claims, No Drawings

HIGH LOADING CARBON BLACK MASTERBATCH FOR PRESSURE PIPE APPLICATIONS

FIELD OF THE DISCLOSURE

This disclosure relates to masterbatches, and more particularly, to high loading carbon black masterbatches for pressure pipe applications.

BACKGROUND

High pressure pipes are commonly used for transporting potable water, effluent, gas, oil, industrial materials, and other such flowable materials. A common component of typical high pressure pipe is high-density polyethylene (HDPE). HDPE is one of the most chemically inert plastics and is, therefore, both chemical-resistant and corrosion-resistant. In addition, HDPE has excellent mechanical properties that tend to be desirable in pressure pipe applications. Based on the polymer strength, pressure pipes can be classified in different categories, such as PE63, PE80 or PE100. In general, the higher the number, the better the crack propagation resistance and the longer the life service the pressure pipe will have under high pressure.

In making such conventional pressure pipe, granules of HDPE are compounded with a carbon black masterbatch, another main component of pressure pipes. Carbon black masterbatch is a mixture of carbon black, polyethylene resin, and possibly additives. The carbon black concentration or loading in conventional masterbatch is in the range of 25% to 40%, with the balance of the mixture being polyethylene resin and various conventional additives. The polyethylene resin is typically a polyolefin carrier such as a low-density polyethylene (LDPE), linear low-density polyethylene (LLDPE), medium-density polyethylene (MDPE) or HDPE.

SUMMARY

One embodiment of the present invention provides a masterbatch for pressure pipe applications. The masterbatch includes carbon black in a concentration that is in excess of 40 weight percent (wt %) of the masterbatch, and a high-density polyethylene (HDPE) carrier resin in a concentration that is in the range of 40 to 60 wt % of the masterbatch and has a melt flow index above 100 g/10 min at 2.16 kg/190° C. and a weight average molecular weight (Mw) that is less than 100000. In some cases, the masterbatch may further include one or more additives in a concentration that is 1 wt % or less of the masterbatch. Other embodiments may have a higher weight percentage of additives, such as up to 5 wt % of the masterbatch. In any such cases, the one or more additives may include, for example, at least one of a lubricant and an anti-oxidant. In one specific case, the one or more additives include a stearate lubricant and a phenolic anti-oxidant. In another specific case, the carbon black is in a concentration that is in the range of 45 to 50 wt % of the masterbatch. In another specific case, microdispersion of carbon black in the masterbatch is rated less than 2 according to ISO 18553. In one such specific case, 98% or more of observed carbon black agglomerates are less than 30 microns. In another such specific case, 90% or more of observed carbon black agglomerates are less than 10 microns. In some particular cases, the masterbatch is included in a pressure pipe compound and is diluted with a base polymer. In one specific example case, the HDPE carrier resin has a weight average molecular weight (Mw) that is less than 80000, a number average molecular weight (Mn) that is less than 14000, and a polydispersity index (PDI) that is less than 6. In another specific case, the HDPE carrier resin has a polydispersity index (PDI) that is less than 5. In another specific case, the carbon black has at least one of a BET Surface area in the range of 65 to 150 m2/g and a DBP absorption in the range of 90 to 110 cc/100 g, and the HDPE carrier resin has a least one of a density>940 kg/m3, a bi-modal molecular weight distribution, a weight average molecular weight (Mw) that is less than 80000, a number average molecular weight (Mn) that is less than 10000, and a polydispersity index (PDI) that is less than 5. Various other combinations of Mw, Mn, and PDI carrier resin parameters will be apparent in light of this disclosure.

A number of variations will be apparent in light of this disclosure. For instance, another example embodiment of the present invention provides a masterbatch for pressure pipe applications. In this specific embodiment, the masterbatch includes carbon black in a concentration that is in the range of 45 to 50 wt % of the masterbatch. The masterbatch further includes an HDPE carrier resin in a concentration that is in the range of 40 to 60 wt % of the masterbatch. In this example case, the HDPE carrier resin has a melt flow index above 100 g/10 min at 2.16 kg/190° C., a weight average molecular weight (Mw) that is less than 80000, a number average molecular weight (Mn) that is less than 14000, and a polydispersity index (PDI) that is less than 6. The masterbatch further includes one or more additives in a concentration that is 5 wt % or less (of the masterbatch), wherein the one or more additives include at least one of a lubricant and an anti-oxidant. In one such specific case, the one or more additives include a stearate lubricant and a phenolic anti-oxidant. In another specific case, microdispersion of carbon black in the masterbatch is rated less than 2 according to ISO 18553, with 98% or more of observed carbon black agglomerates being less than 30 microns. In another specific case, microdispersion of carbon black in the masterbatch is rated less than 2 according to ISO 18553, with 90% or more of observed carbon black agglomerates being less than 10 microns. In some cases, the masterbatch is included in a pressure pipe compound and is diluted with a base polymer, such that there is a 2.0 to 3.0 wt % (e.g., 2.5 wt %) concentration of carbon black in the pressure pipe compound.

Another embodiment of the present invention includes a pressure pipe compound that includes a base polymer and a masterbatch. In this example case, the masterbatch includes carbon black in a concentration that is 45 wt % of the masterbatch, or higher. The masterbatch further includes an HDPE carrier resin in a concentration that is in the range of 40 to 60 wt % of the masterbatch, and has a melt flow index above 100 g/10 min at 2.16 kg/190° C., a weight average molecular weight (Mw) that is less than 80000, a number average molecular weight (Mn) that is less than 14000, and a polydispersity index (PDI) that is less than 6. The masterbatch is diluted by the base polymer such that there is a 1.5 to 3.5 wt % (e.g., 2.0 to 2.5 wt % according to ISO 4427-1) concentration of carbon black in the pressure pipe compound. In one such configuration, the masterbatch further includes one or more additives in a concentration that is 1 wt % or less of the masterbatch, and wherein the one or more additives include at least one of a lubricant and an anti-oxidant. In another such configuration, the carbon black is in a concentration that is in the range of 45 to 50 wt % of the masterbatch. In one specific such case, the carbon black has at least one of a BET Surface area in the range of 65 to 150 m2/g and a DBP absorption in the range of 90 to 110 cc/100 g, and microdispersion of carbon black in the masterbatch is rated less than 2 according to ISO 18553, with 98% or more of observed carbon black agglomerates being less than 30 microns and/or 90% or more of observed carbon black agglomerates being less than 10 microns. In one example case, the pressure pipe compound is in the form of finished pressure pipe.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A high loading carbon black masterbatch formulation is provided, which is particularly suited for pressure pipe applications. In some embodiments, the masterbatch includes a carbon black concentration in excess of 40 wt % of the masterbatch, with the balance of the masterbatch including a high-density polyethylene (HDPE) carrier resin and any number of additives (e.g., flow and dispersion agents and/or anti-oxidants). In one specific case, the HDPE carrier resin has a melt flow index above 100 g/10 min at 2.16 kg/190° C. Optional additives include, for example, calcium stearate and a phenolic anti-oxidant.

General Overview

As previously explained, carbon black concentration or loading in conventional masterbatch is in the range of 25 to 40 wt % (of the masterbatch). To better understand certain embodiments of the invention that have carbon black concentrations in excess of 40 wt %, it is important to first understand the reasons for the long-standing practical limitation on carbon black loading. In particular, there are a number of non-trivial issues associated with masterbatch for pressure pipe applications. These issues include, among others, the dispersion quality of the carbon black and the ease of dilution of the masterbatch with a base polymer for the pipe compounders.

In more detail, and with respect to dispersion quality, the smaller the carbon black particle size, the more difficult that carbon black is to disperse. This is the case when dealing with carbon black grades for pressure pipe applications, which typically call for a carbon black particle size below 25 nm according to ISO 4427. Dilution issues are related to the masterbatch viscosity. Pressure pipe masterbatch can be based, for example, on viscous polyolefin resin as a carrier (e.g., HDPE, LDPE, or LLDPE). In general, the initial viscosity of the polyolefin resin significantly increases when the carbon black is added. That is why typical pressure pipe masterbatch is loaded at 40 wt % or less of carbon black—to maintain acceptable fluidity and therefore acceptable dilutability. Thus, if a conventional masterbatch formulation is configured with a carbon black concentration above 40 wt % using conventional processing, it will tend to result in a masterbatch that is too viscous and/or out of specification for microdispersion.

Another issue associated with masterbatch for pressure pipe applications generally involves the contention between molecular weight and the melt flow index (MFI) of polymers. In more detail, polymers with high molecular weight are of low fluidity (or high viscosity), which means a low MFI. High molecular weight polymers are considered to be very strong materials, because properties like density, impact resistance, stress cracking resistance, resistance to hydrostatic pressure, and crack propagation resistance are directly related to the molecular weight itself (the higher the better). Such physical properties are desirable for pressure pipe applications, and pipe producers typically use a high molecular weight polymer for a base polymer (which is used to dilute the masterbatch in forming the pressure pipe compound).

Molecular weight distribution is of further interest in pressure pipe applications for another reason. Specifically, molecular weight distribution of a pressure pipe compound should not be too broad so as to avoid too many low molecular weight species, which is detrimental for the mechanical properties and organoleptic properties of the pressure pipe compound. In addition, the molecular weight distribution should not be too broad to avoid processing issues like die build-up or deposits (e.g., due to the migration of low molecular weight species to the equipment die exit). On the other hand, the molecular weight distribution of the pressure pipe compound should not be too narrow either; otherwise the processability window also becomes very narrow.

With such considerations in mind (with respect to dispersion quality of the carbon black, ease of dilution of the masterbatch, contention between molecular weight and MFI, and molecular weight distribution), and in accordance with an embodiment of the present invention, a masterbatch is provided that includes a carbon black concentration in excess of 40 wt % and up to 55 wt % of the masterbatch, and in some particular cases, in the range of 45 to 50 wt % (e.g., 45 wt %, 46 wt %, 47 wt %, 48 wt %, 49 wt %, 50 wt %). The carbon black can be configured, for example, such that it complies with desired pressure pipe application requirements. The masterbatch of this example embodiment further includes an HDPE carrier resin suitable for color concentrate masterbatch and having a high MFI (e.g., above 100 g/10 min at 2.16 kg/190° C.). As is known, MFI is used to characterize the ease of flow of the melt of a thermoplastic polymer. It is generally defined as the mass of polymer (e.g., in grams), flowing in a given time period (e.g., 10 minutes) through a capillary of a specific diameter and length by a pressure associated with an applied weight (e.g., 2.16 kg) applied at a given temperature (e.g., 190° C.). Typical MFI measurement standards are further described, for instance, in ASTM D1238 and ISO 1133.

In some example embodiments, the microdispersion rating of carbon black in the masterbatch (after let-down) is less than 3 (according to ISO 18553), and in some specific such cases is less than 2 (according to ISO 18553) with 98% or more of observed carbon black agglomerates being less than 30 microns. Mixing the carbon black and carrier resin can be carried out, for example, using a suitable range mechanical energy and shearing forces for an established time period. The amount of shearing force applied to the carbon black, which allows for deagglomeration and dispersion, depends on factors including not only the mixer setup (e.g., type of mixer, geometry of the rotors or kneading elements, length of the screw, residence time in the mixer, and screw speed), but also the viscosity of the melt during the mixing process (and thus on the molecular weight/MFI of the carrier resin).

In general, and as will be appreciated in light of this disclosure, for a given mixer set-up, it is more difficult to achieve a good carbon black dispersion in a fluid polymer (high MFI) than in a viscous polymer (low MFI), because the shear is transferred from the equipment/mixer to the carbon black through the molten polymer/resin carrier. In this sense, considering a very high fluidity (high MFI) polymer for an application where carbon black dispersion is desirable is not an intuitive choice. This non-intuitiveness is further supported by the fact that the set-up of installed mixers would generally require a minimum viscosity (low MFI) to be efficient in dispersing carbon black. Further discouraging use of such a high MFI polymer is the fact that high MFI generally corresponds to low molecular weight (which is generally a characteristic that is atypical in the context of pressure pipe compounds).

In some embodiments, the carbon black can be configured or otherwise chosen to further facilitate increased loading in the masterbatch, while remaining dispersible and dilutable afterwards. The use of such a carbon black has a number of advantages, such as increasing the viscosity of the melt and thereby improving the overall dispersion of the carbon black. Also, high loading of carbon black in the masterbatch means a lower loading of the carrier resin (wt %), which in turn reduces the amount of low molecular polymer in the final pressure pipe compound after dilution of the masterbatch with the base polymer. This can lessen the potentially adverse impact of a 'stranger polymer' on pressure pipe compound parameters such as density, impact resistance, stress cracking resistance, resistance to hydrostatic pressure and crack propagation resistance.

Thus, an example embodiment of the present invention can be implemented using a combination of a high flow (high MFI) carrier resin and a carbon black that facilitates dispersion. The carbon black loading can be increased up to desired levels while maintaining a suitable dispersion in a fluid carrier, and the reduction in weight % of the high MFI carrier resin included in the masterbatch reduces or otherwise mitigates negative impacts of a stranger polymer in the final application (e.g., where the masterbatch is diluted with a pipe compound base polymer). Masterbatch processing and mixing techniques can be tailored to further facilitate making of such high loading carbon black masterbatch for pressure pipe applications.

Example Formulations

As previously explained, the carbon black can be selected to comply with pressure pipe application requirements, which in one example embodiment includes the following properties: particle size<25 nm (e.g., ASTM D-3849); ash content<0.1% (e.g., ASTM D-1506); toluene extractible<0.03% (e.g., ASTM D-1618); residue on 325 mesh<20 ppm (e.g., ASTM D-1514); and sulphur content<0.1% (e.g., Cabot CTM 15.71). In some such embodiments, the carbon black further includes the following characteristics: BET surface area in the range of 65 to 150 m$^2$/g; and DBP absorption in the range of 90 to 110 cc/100 g. In one specific example embodiment, the carbon black portion of the masterbatch is ELFTEX® P100 produced by Cabot Corporation, although other suitable carbon blacks having comparable qualities/features can be used as well, as will be apparent in light of this disclosure. Other suitable carbon blacks include, for example, ELFTEX® TP, ELFTEX® 254, and others that fulfil the carbon black characteristics provided herein. As will be appreciated in light of this disclosure, the example ranges provided for BET surface area and DBP absorption can be extended to accommodate a specific type of carbon black. These ranges effectively cover specific carbon black grades (e.g., ELFTEX® P100, ELFTEX® TP, ELFTEX® 254) designed for pressure pipe applications.

The carrier resin portion of the masterbatch of this example embodiment includes, for instance, an HDPE that is produced via a catalyst process and suitable for color concentrate masterbatch and has the following features: non-stabilized copolymer with a narrow molecular weight distribution (e.g., wherein Mw<80000, Mn<14000, and PDI<6), a relatively low melt point (e.g., in the range of 100 to 140° C.) and an MFI above 100 g/10 min at 2.16 kg/190° C. In one specific example embodiment, the carrier resin portion of the masterbatch is ELTEX® A1140P produced by INEOS, although other suitable carrier resins or polymers having comparable qualities/features can be used as well, as will be apparent in light of this disclosure. In some such embodiments, the MFI is 150 g/10 min at 2.16 kg/190° C., or higher. Other embodiments may include HDPE carrier resins having one or more of the following qualities: density>940 kg/m$^3$; a bi-modal molecular weight distribution; an MFI>=100 g/10 min at 2.16 kg/190° C.; an Mw<80000; and/or Mn<14000; and a PDI<6.

With respect to the molecular weight distribution of the carrier resin portion of the masterbatch, the molecular weight can be measured, for example, by means of gel permeation chromatography (GPC) at High temperature (e.g., 145° C.), although other suitable measurement methods may be used. In one example GPC method, the carrier resin is diluted in a solvent (e.g., trichlorobenzene) and then injected into a heated column. A differential refractive index (DRI) detector detects the polyethylene macromolecules when they exit the column. The time to exit the column (retention time, or RT) depends on the mass/size of the polyethylene macromolecules. A chromatogram of the refractive index relative to the mass of the molecule versus their retention time can then be plotted, which can be translated into a molecular distribution curve (weight fraction versus molecular mass) allowing for extraction of useful data such as weight average molecular weight (Mw), number average molecular weight (Mn), and polydispersity index (PDI), which is the ratio Mw/Mn and indicates how broad the molecular distribution (higher PDI means broader distribution). As previously indicated, one example embodiment of high loading carbon black masterbatch for pressure pipe application uses an HDPE carrier resin having an Mw that is less than 80000, an Mn that is less than 14000, and PDI that is less than 6, with a specific example embodiment having an Mw of 31000 or less, an Mn of 8500 or less, and a PDI of 3.6 or less. Other molecular weight parameter values within these given ranges will be apparent (e.g.: wherein Mw<100000, Mn<10000, and PDI<5; or wherein Mw<95000, Mn<9500, and PDI<4.75; or wherein Mw<90000, Mn<9000, and PDI<4.5; or wherein Mw<85000, Mn<8500, and PDI<4.25; or wherein Mw<75000, Mn<14000, and PDI<6; or wherein Mw<70000, Mn<14000, and PDI<6; or wherein Mw<65000, Mn<14000, and PDI<6; or wherein Mw<60000, Mn<14000, and PDI<6; or wherein Mw<55000, Mn<14000, and PDI<6; or wherein Mw<50000, Mn<14000, and PDI<6; or wherein Mw<45000, Mn<14000, and PDI<6; or wherein Mw<40000, Mn<14000, and PDI<6; or wherein Mw<35000, Mn<14000, and PDI<6; or wherein Mw<30000, Mn<14000, and PDI<6; or wherein Mw<25000, Mn<14000, and PDI<6). As will be appreciated in light of this disclosure, an appropriate tolerance can be assigned to these specific example values, such as a 10 or 20% tolerance. In contrast, conventional masterbatches for pressure pipe applications generally employ HDPE carrier resins having an Mw in the range of 100000 to 400000 (typically around 250000), an Mn in the range of 10000 to 25000 (typically around 15000), and a PDI in the range of 5 to 15 (typically around 10).

The masterbatch formulation may further include one or more additives, in accordance with some embodiments. Additives may include, for example, anti-agglomerates and flow agents such as calcium stearate and/or anti-oxidants such as phenolic anti-oxidants. Other example additives can be used as well to facilitate or otherwise benefit processing of the masterbatch, such as those additives that decrease build-up and/or reduce wear on processing equipment (e.g., extruder orifices and die head), increase throughput, decrease power consumption and/or processing temperature, and eliminate or otherwise reduce surface defects.

Specific example formulations that can be implemented in accordance with some embodiments of the present invention are shown in Table 1. Other embodiments will be apparent.

TABLE 1

Example Formulations of High Loading Carbon Black Masterbatch

| Example | Carbon Black (weight %) | HDPE (weight %) | Calcium Stearate (weight %) | Phenolic Anti-Oxidant (weight %) |
|---|---|---|---|---|
| #1 | 45 wt % | 54 wt % | 0.5 wt % | 0.5 wt % |
| #2 | 47.5 wt % | 51.5 wt % | 0.5 wt % | 0.5 wt % |
| #3 | 50 wt % | 49 wt % | 0.5 wt % | 0.5 wt % |
| #4 | 51 wt % | 48 wt % | 0.5 wt % | 0.5 wt % |
| #5 | 52 wt % | 47 wt % | 0.5 wt % | 0.5 wt % |
| #6 | 53 wt % | 46 wt % | 0.5 wt % | 0.5 wt % |
| #7 | 54 wt % | 45 wt % | 0.5 wt % | 0.5 wt % |
| #6 | 55 wt % | 44 wt % | 0.5 wt % | 0.5 wt % |
| #7 | 45.5 wt % | 54 wt % | 0.5 wt % | none |
| #8 | 47.5 wt % | 52.5 wt % | none | none |
| #9 | 50 wt % | 49 wt % | 1.0 wt % | none |
| #10 | 50 wt % | 50 wt % | none | none |
| #11 | 45 wt % | 55 wt % | none | none |
| #12 | 55 wt % | 45 wt % | none | none |

As will be appreciated in light of this disclosure, additives other than calcium stearate or phenolic anti-oxidant can be used, so long as desired dispersion and flowability can be achieved. In addition, the weight percent of any given additive can vary given the demands of the target application. For example, other embodiments may have a higher weight percentage of additives, such as up to 5 wt % of the masterbatch (e.g., 2.5 wt % of calcium stearate and 2.5 wt % of phenolic antioxidant). Thus, depending on the weight percentage of such additives and carbon black loading, the weight percentage of the carrier resin can increase (e.g., up to 60 wt %, with 40 wt % carbon black loading and no additives) or decrease accordingly (e.g., down to 40 wt %, with 55 wt % carbon black loading and 5 wt % of additives). Note that the target loading values of carbon black and/or other components of the masterbatch can be associated with reasonable tolerances (e.g., +/−1.5% around the targeted weight percentage, or other suitable tolerance given demands of the intended application) if so desired. However, the actual loading of carbon black in the masterbatch not below 40 wt %.

Alternative flow agents or anti-agglomerates or processing aids include, for example, zinc stearate or calcium stearate (e.g., with loading up to 2 wt %), and/or other suitable lubricants and release agents that help avoid latching issues, such as melt sticking to the doors or orifices at discharge in a batch process. Anti-oxidants such as phenolic anti-oxidants can be added, for example, to provide processing stability and long term heat stability. Any suitable phenolic anti-oxidant can be used, and there are a large number of commercially available brands. A phosphite anti-oxidant also provides heat stability in high temperature processing and may be used on its own as an alternate to phenolic anti-oxidants or in conjunction with phenolic anti-oxidants because of synergistic effect. Other additives that can be used as alternatives to, or in conjunction with, such flow agents and/or anti-oxidants include, for instance, ultraviolate (UV) stabilizers which inhibit degradation of finished products (such as pressure pipe) by UV radiations. Examples include hindered amine light stabilizers and nickel quenchers. Fluoroelastomers may also be used as processing aids, in that they prevent various undesirable conditions, such as die build-up (agglomeration of molten product at die exit), melt fracture (poor product surface quality), and permit various desirable conditions such as increased output and the reduction of operating pressures.

Specific example phenolic antioxidants (e.g., with loading up to 4 wt %) include: Ciba® Irganox® 1010; Anox® 20 by Chemtura Corporation; Hostanox® 010 by Clariant Corporation; and Songnox® 1010 from Songwon Industrial Co., Ltd. Example phosphite antioxidants (e.g., with loading up to 2 wt %) include: Ciba® Irgafos® 168, Alkanox® 240 by Chemtura Corporation; and Songnox® 1680 from Songwon Industrial Co., Ltd. Example UV stabilizers (e.g., with loading up to 3 wt %) include: Lowilite® 62 by Chemtura Corporation; Ciba® Chimassorb® 81; Ciba® Tinuvin® 622; Ciba® Uvinul® 5062H, Lowilite® Q84 by Chemtura Corporation; and Songsorb® 1084 by Songwon Industrial Co., Ltd. Example polymer processing aids/fluoroelastomers (e.g., with loading up to 1 wt %) include: Dynamar™ FX5920 and Dynamar™ FX5922 by Dyneon LLC; DA-810™ and DA-910™ by Daikin Industries, Ltd.; DuPont® Viton® FF; and Solef® 11010 and Tecnoflon® NM by Solvay Solexis, Inc. Note that the wt % given in these examples is with respect to the masterbatch.

Measured Performance

Measured performances on example batches of masterbatch configured in accordance with various embodiments of the present invention, with respect to parameters including ash residue, MFI, and microscopic dispersion, are summarized in Table 2, which shows three example carbon black loadings (45 weight %, 47.5 weight %, and 50 weight %) for masterbatch. The carbon black used was ELFTEX® P100, and the carrier resin used was ELTEX® A1140P. Note, however, that other carbon blacks and/or carrier resins that are comparable to these (or otherwise suitable in light of this disclosure) can be used, as will be appreciated. MFI and ash residue are directly measured on the masterbatch, and the microdispersion test is carried out after let-down of the masterbatch to form a pressure pipe compound. Note, however, and as will be appreciated in light of this disclosure, even though the microdispersion test is executed at the application level (in this case, on pressure pipe compound), it also reflects on the dispersion quality of the masterbatch itself. As can further be seen, after let-down of the masterbatches (by diluting with HDPE at 200° C. in these examples), the final carbon black content is about 2.5 weight %, which is a typical loading for pressure pipe compounds according to ISO 4427-1 requirements. The HDPE used in these example cases was HDPE 2008 SN 60 by Total Petrochemicals, by any number of suitable base polymers can be used here, as will be apparent in light of this disclosure. A pressure pipe compound containing 2.5% carbon black can be achieved, for instance, by compounding a 6% addition of a high loading carbon black masterbatch with 94% of a natural resin such as HDPE. The compounding and extruding can be carried out using, for example, an internal mixer (e.g., such as a Banbury or Kobelco type), two roll mill, a BUSS ko-kneader, or a single or twin screw extruder. In the examples reflected in Table 2, a single screw extruder was used, set at 200° C. and 40 RPM. The resulting pressure pipe compound can be extruded or molded to make pressure pipe for any number of applications. As will be appreciated, compounds having other carbon black loadings (e.g., 1.5 to 3.5 wt % or other suitable range) can be used as well, and the present invention is not intended to be limited, for instance, to pipe compound embodiments configured in accordance with ISO 4427-1.

TABLE 2

High Carbon Black Loading Masterbatch Performance

| Carbon Black Loading (weight %) | Ash Residue N$_2$/900° C. wt % Carbon Black | MFI 21.6 kg/ 190° C. g/10 min | Microscopic Dispersion 2.5 wt % Carbon Black in HDPE; 200° C. | |
|---|---|---|---|---|
| | | | Avg Rating | Max Button Rating |
| 45 wt % batch 1 | 44.3 | >150 | 1.6 | 2.0 |
| 45 wt % batch 2 | 44.4 | >150 | 1.5 | 2.5 |
| 47.5 wt % batch 1 | 47 | 60.8 | 1.8 | 2.5 |
| 47.5 wt % batch 2 | 46.8 | 62.6 | 1.8 | 2.5 |
| 50 wt % batch 1 | 49.3 | 16.2 | 1.7 | 3.0 |
| 50 wt % batch 2 | 49.3 | 14.9 | 1.6 | 2.0 |

The ash residue in this specific example refers to the actual weight percent (wt %) of carbon black loading in the masterbatch after full pyrolysis of the masterbatch at 900° C. under nitrogen (N$_2$) for a period of time (e.g., 5 minutes). As can be seen, the actual carbon black loading in weight % for each of these example batches is within 0.5 to 0.7 of the target carbon black loading in weight %. As can further be seen with respect to the specific example embodiments of Table 2, the MFI of the masterbatch generally decreases with increasing carbon black loading, ranging from greater than 150 g/10 min at 190° C. and 21.6 kg for carbon black loading of 45% to about 15 or 16 g/10 min at 190° C. and 21.6 kg for carbon black loading of 50%. Note that the high MFI of the carrier resin making up the masterbatch is distinct from the MFI of the masterbatch itself, as well as from the MFI of the diluted masterbatch.

The microscopic dispersion test used for the particular examples shown in Table 2 involves a press-out method carried out in accordance with 18553, which generally involves examination of thin hot-pressed compound samples under an optical microscope using transmitted light. A rating is provided based on the size and number of undispersed carbon black agglomerates. In more detail, pinhead size pieces of the pressure pipe compound (i.e., high loading masterbatch as described herein, let-down/diluted with a suitable base polymer such as HDPE) are then taken and hot pressed between two clear glass microscope slides. The resultant buttons are then examined under a microscope at suitable magnification (e.g., ×100, or higher) and rated following a rating table given in ISO 18553. As can be seen in Table 2, the example embodiments provided have an average rating in the range of 1.5 to 1.8 (which is well within the ISO 4427 standard rating of <3), and a maximum button rating in the range of 2.0 to 3.0 (well within the ISO 4427 standard rating of <4.5 over six buttons). For purposes of clarity, note that there is a distinction between the ISO 4427-1 and ISO 18553. In particular, ISO 4427, which is directed to plastics piping systems (specifically, polyethylene pipes and fittings for water supply), states the requirements for pipe systems such as pipe dimensions and operating pressures, as well as requirements for and pressure pipe compounds such as microdispersion, density, oxidation induction time and other various pipe compound parameters. ISO 18553, which is directed to methods for the assessment of the degree of pigment or carbon black dispersion in polyolefin pipes, fittings and compounds, describes the microdispersion test method and provides the microdispersion rating table relevant to pressure pipe.

In at least one sense, ISO 18553 specifies a more objective standard for assessing microscopic dispersion that involves an actual count of the number and size of each undispersed carbon black agglomerate. Measured microscopic dispersion with respect to the ISO 18553 standard on example batches of pressure pipe compound, along with the corresponding agglomerate size distribution, are summarized in Tables 3, 4, and 5, which show pressure pipe compound samples made with the high carbon black loading masterbatches of Table 2 (loading of 45 weight %, 47.5 weight %, and 50 weight %), in accordance with three specific example embodiments. Each individual carbon black agglomerate in a given button can be observed and measured. As carbon black agglomerates are typically round or slightly ellipsoidal, the diameter or the largest dimension of the agglomerate can be used to represent the size of the agglomerate. Thus, when an observed carbon black agglomerate is said to be less than X microns herein, then that observed agglomerate has a largest dimension that is smaller than X.

TABLE 3

Microdispersion - Agglomerate Size Distribution

| Carbon Black Loading (wt %) | Agglomerate Size (μm) | | | | | | Microscopic Dispersion 2.5% Carbon Black in HDPE; 200° C. | |
|---|---|---|---|---|---|---|---|---|
| | 5 10 | 11 20 | 21 30 | 31 40 | 41 50 | 51 60 | Avg Rating | Max Button Rating |
| 45 wt % batch 1 | 371 | 24 | 3 | | | | 1.6 | 2.0 |
| 45 wt % batch 2 | 305 | 24 | 9 | | | | 1.5 | 2.5 |
| 47.5 wt % batch 1 | 408 | 39 | 3 | 3 | 3 | | 1.8 | 2.5 |
| 47.5 wt % batch 2 | 400 | 32 | 5 | 3 | 1 | | 1.8 | 2.5 |
| 50 wt % batch 1 | 296 | 20 | 8 | | 3 | | 1.7 | 3.0 |
| 50 wt % batch 2 | 320 | 23 | 2 | 2 | | | 1.6 | 2.0 |

As previously discussed with reference to Table 2, the sample masterbatches were let-down to a final carbon black content of 2.5%. For pressure pipe compound, ISO 4427 states for microdispersion performance that the average rating should be a maximum of 3, and a maximum rating over 6 buttons is 4.5. To increase the confidence level in the microdispersion results, 60 buttons per sample were taken into consideration, which is 10 times more than the ISO 18553 recommendation. As can be seen with respect to Table 3, most of the viewed agglomerates are in the 5 to 10 microns (μm) size range (from 296 to 408 agglomerates detected), with the second largest class size being in the 11 to 20 microns size range (20 to 39 agglomerates). The next largest class size is in the 21 to 30 microns size range (2 to 9 agglomerates). The next largest class size is in the 31 to 40 microns size range (2 to 3 agglomerates). The next largest class size is in the 41 to 50 microns size range (1 to 3 agglomerates). As can be further seen, no agglomerates were detected in the 51 to 60 microns size range or higher.

TABLE 4

Microdispersion - Agglomerate Size Distribution

| | Percentage of Agglomerates | | | |
|---|---|---|---|---|
| | >30 μm | >40 μm | >50 μm | Agglom. Total |
| 45 wt % batch 1 | 0.8 | 0 | 0 | 398 |
| 45 wt % batch 2 | 0 | 0 | 0 | 338 |
| 47.5 wt % batch 1 | 1.3 | 0.7 | 0 | 456 |
| 47.5 wt % batch 2 | 0.9 | 0.2 | 0 | 441 |
| 50 wt % batch 1 | 0.9 | 0.9 | 0 | 327 |
| 50 wt % batch 2 | 0.6 | 0 | 0 | 347 |

As can be seen with respect to Table 4, 98% or more of the observed agglomerates are smaller than 30 microns for all the samples. In more detail: for pressure pipe compound made with masterbatch having 45 weight % carbon loading, 99.2% or more of the observed agglomerates were smaller than 30 microns; for pressure pipe compound made with masterbatch having 47.5 weight % carbon loading, 98.7% or more of the observed agglomerates were smaller than 30 microns; and for pressure pipe compound made with masterbatch having 50 weight % carbon loading, 99.1% or more of the observed agglomerates were smaller than 30 microns. Table 4 further shows that the observed agglomerates larger than 40 microns are even fewer (in the range of 0.9% to 0%), and none of the samples exhibited observed agglomerates larger than 50 microns. As will be appreciated, the Table 3, 4 and 5 examples demonstrate very good microdispersion performance of products configured in accordance with embodiments of the present invention.

TABLE 5

Microdispersion - Agglomerate Size Distribution

| Carbon Black Loading (wt %) | ≤10 μm | ≤20 μm | ≤30 μm |
|---|---|---|---|
| 45 wt % batch 1 | 93.2% | 99.2% | 99.2% |
| 45 wt % batch 2 | 90.2% | 97.3% | 100% |
| 47.5 wt % batch 1 | 89.5% | 98.0% | 98.7% |
| 47.5 wt % batch 2 | 90.7% | 98.0% | 99.1% |
| 50 wt % batch 1 | 90.5% | 96.6% | 99.1% |
| 50 wt % batch 2 | 92.2% | 98.8% | 99.4% |

As can be seen with reference to Table 5, for pressure pipe compound made with masterbatch having 45 weight % carbon loading, 90.2% or more of the observed agglomerates were 10 microns or smaller; for pressure pipe compound made with masterbatch having 47.5 weight % carbon loading, 89.5% or more of the observed agglomerates were 10 microns or smaller; and for pressure pipe compound made with masterbatch having 50 weight % carbon loading, 90.5% or more of the observed agglomerates were 10 microns or smaller. Table 5 further shows the corresponding percentages of observed agglomerates that are 20 microns or smaller as well as 30 microns or smaller.

In addition to ease of dispersion and optimum microdispersion performance, such high carbon black loading masterbatch provides other advantages for masterbatch producers as well as pressure pipe compounders and producers, as will be apparent in light of this disclosure. For instance, and in accordance with some embodiments such as those where the carbon black is ELFTEX® P100 and the carrier resin is ELTEX® A1140P, the melt temperature during processing can be kept below about 180° C. which causes less thermal degradation of any additives package added in the formulation; the mixing equipment can operate far below its maximum power and torque capacity, thereby consuming less energy and being more cost effective; pressure pipe compounders need a lower amount of this masterbatch to achieve the common 2.5% carbon black loading (or other desired loading target) in the final compound, and/or using a lower amount of masterbatch is further helpful in that it reduces the negative impact of the masterbatch on the intrinsic mechanical properties of the pressure pipe dilution resin.

Although any number of suitable mixing equipment types and brands can be used as will be apparent in light of this disclosure, the actual samples reflected in Tables 2-4 were prepared using a 1.642 L Banbury mixer by Farrel Corporation, which gives batch samples of approximately 1.3-1.4 kg depending on batch density. The following process conditions can be applied, in accordance with an embodiment of the present invention: chamber temperature of 60° C.; rotor temperature of 60° C.; mixing time post flux of 90 seconds; ram pressure of 4.2 bars; and rotor speed of 175 RPM. Each of these parameters may be associated with an acceptable tolerance, such as +/−5% or +/−20%. The tightness of the tolerance will depend, for example, on the desired accuracy and demands of the application on the resulting masterbatch product. Numerous other manufacturing schemes will be apparent in light of this disclosure.

Table 6 identifies some example requirements for black pressure pipe compound according to industry standards such as EN1201, NF114, and EN13244, and in accordance with some embodiments of the present invention.

TABLE 6

Pressure Pipe Requirements

| Property | Limit | Test Method |
|---|---|---|
| Carbon Black Particle Size | <=25 nm | ASTM D-3849 |
| Carbon Black Content | 2.0-2.6% | ISO 6964 |
| Carbon Black Dispersion | <=3 | ISO 18553 |
| Density | >=930 kg/m$^3$ | ISO 1183 |
| Melt Flow Index | 0.2-1.1 g/10 min (5 kg/190° C.) | ISO 1133 |
| Oxidation Induction Time 200° C. | >20 minutes | EN 728 |
| Water Content | <=300 ppm | EN 12118 |
| Volatiles | <=350 ppm | EN 12099 |
| UV Weathering Exposure | >=3.5 GJm$^{-2}$ | ISO 1056 and 4607 |
| Mechanical Properties | | on pipes: tensile, pressure and crack propagation |
| Drinking Water Quality | | National Regulations |

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A masterbatch for pressure pipe applications, comprising:
   carbon black dispersed in a high-density polyethylene (HDPE) carrier resin, the carbon black having a particle size of less than 25 nm by ASTM D-3849 in a concentration that is in excess of 40 weight percent (wt %) of the masterbatch; and
   wherein the resin has a density of greater than 940 kg/m$^3$, is in a concentration that is in the range of 40 to 60 wt % of the masterbatch, has a melt flow index above 100 g/10 min at 2.16 kg/190° C., and a weight average molecular weight (Mw) that is less than 100000.

2. The masterbatch of claim 1, comprising:
one or more additives in a concentration that is 1 wt % or less of the masterbatch.

3. The masterbatch of claim 2 wherein the one or more additives include a stearate lubricant and a phenolic antioxidant.

4. The masterbatch of claim 1 wherein the carbon black is in a concentration that is in the range of 45 to 50 wt % of the masterbatch.

5. The masterbatch of claim 1 wherein microdispersion of carbon black in the masterbatch is rated less than 2 according to ISO 18553.

6. The masterbatch of claim 5 wherein 98% or more of observed carbon black agglomerates are less than 30 microns.

7. The masterbatch of claim 5 wherein 90% or more of observed carbon black agglomerates are less than 10 microns.

8. The masterbatch of claim 1 wherein the masterbatch is included in a pressure pipe compound and is diluted with a base polymer.

9. The masterbatch of claim 1 wherein the HDPE carrier resin has a weight average molecular weight (Mw) that is less than 80000, a number average molecular weight (Mn) that is less than 14000, and a polydispersity index (PDI) that is less than 6.

10. The masterbatch of claim 1 wherein the HDPE carrier resin has a polydispersity index (PDI) that is less than 5.

11. The masterbatch of claim 1 wherein the carbon black has at least one of a BET Surface area in the range of 65 to 150 $m^2/g$ and a DBP absorption in the range of 90 to 110 cc/100 g, and the HDPE carrier resin has at least one of a bi-modal molecular weight distribution, a weight average molecular weight (Mw) that is less than 80000, a number average molecular weight (Mn) that is less than 10000, and a polydispersity index (PDI) that is less than 5.

12. A masterbatch for pressure pipe applications, comprising:
carbon black in a concentration that is in the range of 45 to 50 weight percent (wt %) of the masterbatch, the carbon black having an average particle size less than 25 nm by ASTM D-3849;
a high-density polyethylene (HDPE) carrier resin having a density of greater than 940 $kg/m^3$, the resin in a concentration that is in the range of 40 to 55 wt % of the masterbatch and has a melt flow index above 100 g/10 min at 2.16 kg/190° C., a weight average molecular weight (Mw) that is less than 80000, a number average molecular weight (Mn) that is less than 14000, and a polydispersity index (PDI) that is less than 6; and
one or more additives in a concentration that is 5 wt % or less of the masterbatch, wherein the one or more additives include at least one of a lubricant and an antioxidant and wherein the carbon black is dispersed in the carrier resin.

13. The masterbatch of claim 12 wherein the one or more additives include a stearate lubricant and a phenolic antioxidant.

14. The masterbatch of claim 12 wherein microdispersion of carbon black in the masterbatch is rated less than 2 according to ISO 18553, with 98% or more of observed carbon black agglomerates being less than 30 microns.

15. The masterbatch of claim 12 wherein microdispersion of carbon black in the masterbatch is rated less than 2 according to ISO 18553, with 90% or more of observed carbon black agglomerates being less than 10 microns.

16. The masterbatch of claim 12 wherein the masterbatch is included in a pressure pipe compound and is diluted with a base polymer, such that there is a 2.0 to 3.0 wt % concentration of carbon black in the pressure pipe compound.

17. A pressure pipe compound, comprising:
a base polymer; and
a masterbatch, comprising:
carbon black dispersed in the masterbatch in a concentration that is 45 weight percent (wt %) of the masterbatch, or higher, the carbon black having an average particle size less than 25 nm by ASTM D-3849; and
a high-density polyethylene (HDPE) carrier resin having a density of greater than 940 $kg/m^3$, the resin in a concentration that is in the range of 40 to 55 wt % of the masterbatch and has a melt flow index above 100 g/10 min at 2.16 kg/190° C., a weight average molecular weight (Mw) that is less than 80000, a number average molecular weight (Mn) that is less than 14000, and a polydispersity index (PDI) that is less than 6;
wherein the masterbatch is diluted by the base polymer such that there is a 1.5 to 3.5 wt % concentration of carbon black in the pressure pipe compound.

18. The pressure pipe compound of claim 17 wherein the masterbatch further comprises one or more additives in a concentration that is 1 wt % or less of the masterbatch, and wherein the one or more additives include at least one of a lubricant and an anti-oxidant.

19. The pressure pipe compound of claim 17 wherein the carbon black is in a concentration that is in the range of 45 to 50 wt % of the masterbatch and has at least one of a BET Surface area in the range of 65 to 150 $m^2/g$ and a DBP absorption in the range of 90 to 110 cc/100 g, and microdispersion of carbon black in the masterbatch is rated less than 2 according to ISO 18553, with 98% or more of observed carbon black agglomerates being less than 30 microns and/or 90% or more of observed carbon black agglomerates being less than 10 microns.

20. The pressure pipe compound of claim 17 wherein the pressure pipe compound is in the form of finished pressure pipe.

* * * * *